(12) United States Patent
Bullen

(10) Patent No.: US 6,232,736 B1
(45) Date of Patent: May 15, 2001

(54) NUMERICAL CONTROL MACHINE TOOL POSITIONING SYSTEM

(75) Inventor: George Nicholas Bullen, Oxnard, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/517,694

(22) Filed: Aug. 26, 1997

Related U.S. Application Data

(63) Continuation of application No. 08/540,525, filed on Oct. 10, 1995, now abandoned.

(51) Int. Cl.[7] .................................................. G01B 5/00
(52) U.S. Cl. ................... 318/575; 318/568.1; 318/632; 318/640; 364/474.28; 33/1 M; 156/433
(58) Field of Search .......................... 318/560–646; 364/474.1–474.35; 82/134; 395/80–89; 901/3, 5, 7, 9, 12, 13, 15, 20–23; 156/425–433, 525, 520, 523, 576; 33/1 M; 456/433

(56) References Cited

U.S. PATENT DOCUMENTS

| | | |
|---|---|---|
| 1,101,966 | 6/1914 | Schoenky . |
| 1,488,711 | 4/1924 | Rohlfing . |
| 1,814,963 | 7/1931 | Robinson et al. . |
| 4,111,085 * | 9/1978 | Johnson ........................................ 83/1 |
| 4,558,480 * | 12/1985 | Okafuji et al. ............................ 15/77 |
| 4,561,776 | 12/1985 | Pryor . |
| 4,564,410 * | 1/1986 | Clitheros et al. ..................... 156/356 |
| 4,637,761 * | 1/1987 | Murray et al. .......................... 408/16 |
| 4,730,373 | 3/1988 | Senoh . |
| 4,752,160 * | 6/1988 | Murray et al. .......................... 408/16 |
| 4,776,749 | 10/1988 | Wazenberg et al. . |
| 4,856,945 | 8/1989 | Bareis . |
| 4,890,750 | 1/1990 | Stern . |
| 4,936,497 * | 6/1990 | Ordelt ....................................... 227/5 |
| 4,943,338 * | 7/1990 | Wisbey ................................. 156/433 |
| 5,183,377 | 2/1993 | Becker et al. . |
| 5,210,697 * | 5/1993 | Kawanabe ....................... 364/474.35 |
| 5,315,526 * | 5/1994 | Maeda et al. .................... 364/474.28 |
| 5,493,779 * | 2/1996 | Zakrajsek et al. ..................... 33/1 M |
| 5,499,547 * | 3/1996 | Nagai et al. ......................... 74/89.15 |

\* cited by examiner

Primary Examiner—Paul Ip
(74) Attorney, Agent, or Firm—Terry J. Anderson; Karl J. Hoch, Jr.

(57) ABSTRACT

The present invention is embodied in an automated system for the positioning and support of a machine tool within a workpiece supporting assembly, comprising a pair of generally parallel, planar longitudinal translation modules affixed to the assembly and having longitudinal sliding pads and a longitudinal movement device, a transverse translation module affixed to the longitudinal sliding pads in a generally perpendicular orientation to the longitudinal modules and having transverse sliding pads and a transverse movement device. The system also includes a vertical translation module affixed to the transverse sliding pads in a generally perpendicular orientation to the longitudinal and transverse translation modules and having vertical sliding pads and a vertical movement device, the vertical translation module further comprising a mounting device for the machine tool and a device to rotate the machine tool about a vertical axis and a device to pivot the machine tool about any axis orthogonal to the vertical axis, and a control device.

37 Claims, 4 Drawing Sheets

NUMERICAL CONTROL MACHINE TOOL POSITIONING SYSTEM

This application is a continuation of Ser. No. 08/540,525 filed Oct. 10, 1995, abandoned.

BACKGROUND OF THE INVENTION

1. Technical Field

The present invention relates to a numerical control ("NC") system for a five-axis precision positioning and support of a machine tool with respect to a workpiece surface in a work envelope.

2. Background Art

The precision machining of large workpieces requires the use of a wide array of expensive machine tools such as full size models and gauges, templates, fixtures, and drill-sets. These tools have a substantial acquisition and maintenance costs, as well as costs related to their storage, property management, inspection, reinspection, and accountability. In addition, the manufacturing tolerances and repeatability achievable with these tools is limited.

For example in the aerospace industry, large airframe components such as fuselage sections can be precision machined only with the use of very costly full size models and gauges. A typical series of models needed to drill precision holes is shown in FIGS. 1A–1B. As shown in FIG. 1A, the first step in this process is to fabricate a male master model 100 of a fuselage section, which model is made of metal or plaster and has projections 105 of the size and at the locations required for the holes to be drilled in the fuselage section. A female plaster cast 110 is formed over the model 100, which cast has apertures 115 formed over the projections 105. As shown in FIG. 1B, a male cast back 120 is formed from the plaster cast 110, which cast back is also made from plaster. Again, projections 125 are formed by the plaster flowing into the apertures 115 in the cast 110. Finally, a drill bonnet 130 made of a composite material, such as fiberglass or graphite composite, is formed over the cast back 120. The bonnet 130 has apertures 135 of the correct size and at the correct locations where holes are required to be drilled.

The first step in using the bonnet 130 is to fasten a fuselage section into an assembly jig using bracing means, or "details", and locator pins to provide a reference position for the fuselage. The bonnet 130 is then secured adjacent the fuselage section and aligned with the section using the locator pins. The bonnet 130 then serves as a drilling template through which holes are drilled into the fuselage section.

The cost to fabricate a typical drill bonnet 130 can average $1 million and take from one to 12 weeks. For the F-18 aircraft, 900 bonnets are needed to drill all the fuselage holes. Thus, the total cost for the drill bonnet tool family for the F-18 is approximately $1 billion. Full scale interior models, called master gages, are also required to precisely locate and drill holes in details which are attached to interior structures of the assembly jig. These details are used to locate the bulkheads, frames and ribs of the aircraft. Such master gages can cost between $5–10 million each and the F-18 requires 33 such master gages, for a total master gage tool family cost of approximately $250 million.

One object of the invention is to eliminate the need for these costly tool families and replace them with a machine tool locating system made from standardized parts to reduce cost and fabrication time. Another object of the invention is to improve the accuracy of hole location by eliminating the cumulative tolerance resulting from the use of multiple master models and gages, and related molds.

Another object of the invention is to increase the speed with which an assembly jig can be prepared to machine a new workpiece, or implement engineering changes to an existing workpiece design. Previously, new master models and gages would have to be fabricated for either a new aircraft component or changes to an existing one, requiring from four to 24 weeks to prepare. A positioning system of invention can locate machine tools directly from machine design software, reducing this aircraft change time to one or two days.

SUMMARY OF THE INVENTION

The present invention is embodied in an automated system for the positioning and support of a machine tool within a workpiece supporting assembly, comprising a pair of generally parallel, planar longitudinal translation modules affixed to the assembly and having sliding pads and a movement means, a transverse translation module affixed to the longitudinal sliding pads in a generally perpendicular orientation to the longitudinal modules and having sliding pads and a movement means. The system also includes a vertical translation module affixed to the transverse sliding pads in a generally perpendicular orientation to the longitudinal and transverse translation modules and having sliding pads and a movement means, the vertical translation module further comprising a mounting means for the machine tool and a means to rotate the machine tool about a vertical axis and a means to pivot the machine tool about any axis orthogonal to the vertical axis, and a control means.

DETAILED DESCRIPTION OF THE PREFERRED EMBODIMENT

Figure 2:
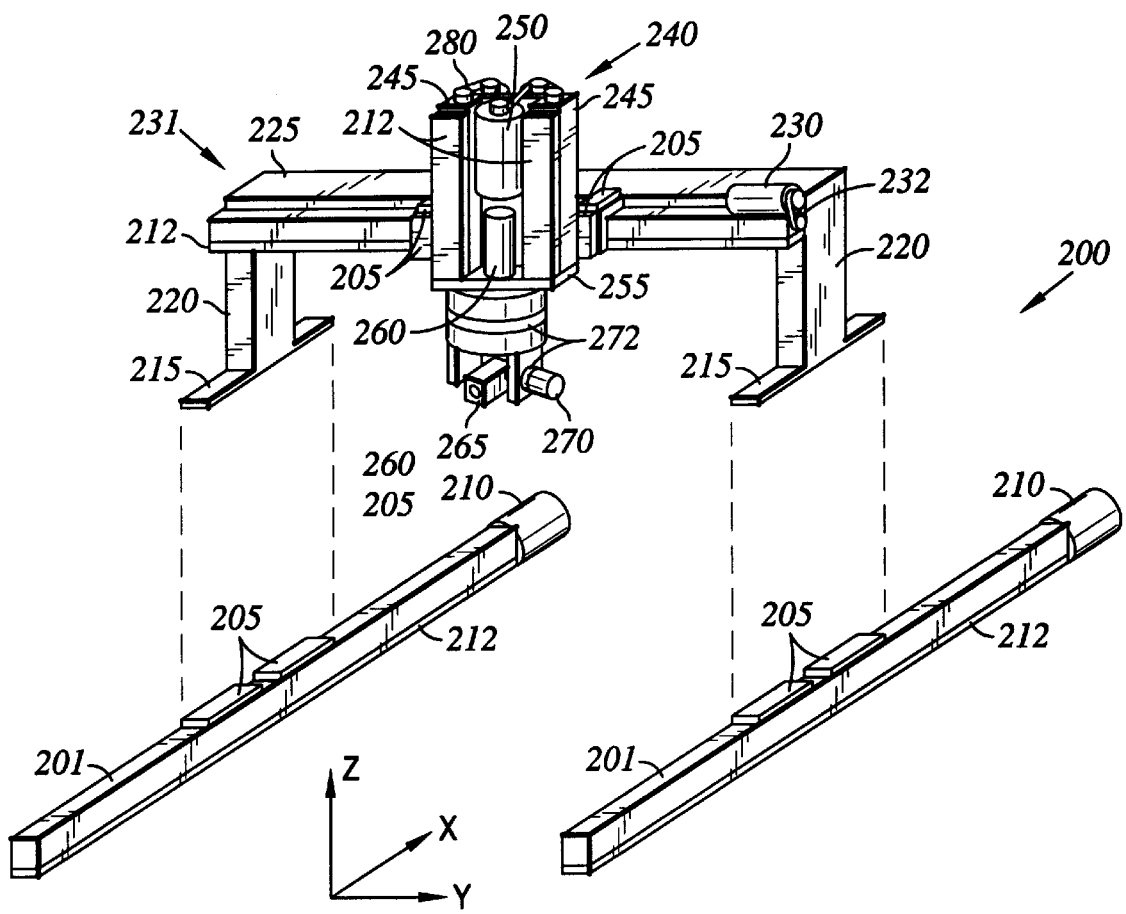
FIG. 2 is a perspective view of a positioning system of the invention.
Figure 6:
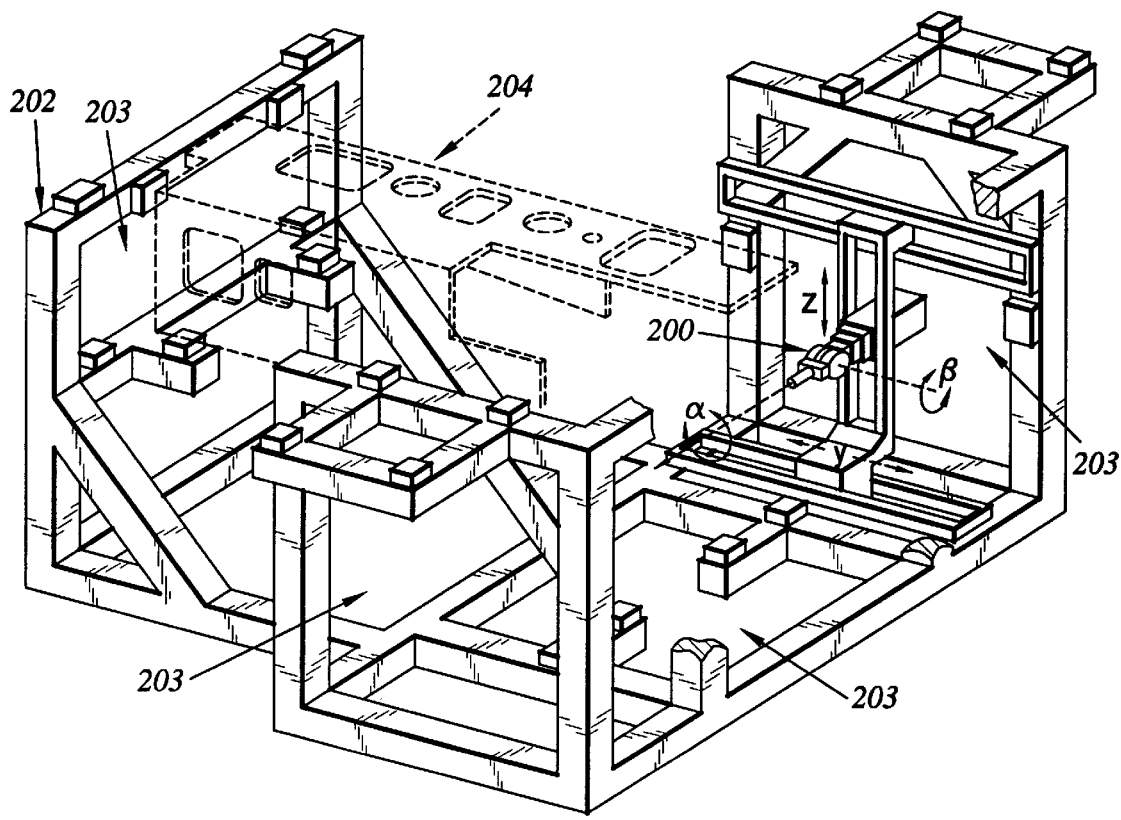
FIG. 6 is a perspective view of the positioning system of the present invention within a jig assembly.

As shown in FIG. 2, a system 200 of the invention uses two longitudinal translation modules 201 positioned parallel to an x axis. The function and construction of these modules 201 is similar to other translation modules used in the invention for transverse and vertical movement as explained below. The modules 201 may be temporarily or permanently attached to a jig frame 202 having a workpiece within the jig frame 202, as shown in FIG. 6 and located with conventional locator pins in reference positions 203 of the frame 202, as shown in FIG. 6.

Sliding pads 205 translate along each module 201 in response to synchronized servo motors 210, by means described below. The sliding pads 205 are similar to sliding pads used on other translation modules used in the invention. The pads 205 will be of an appropriate size depending on the size of the structure being translated and the distance of travel. The modules 201 also include linear sensors 212 along the length of the module. The sensors 212 are of a conventional design such as glass scales or digital strips. Again, the sensors 212 are similar to sensors used on other translation modules and will generally have a length of approximately the same length as the translation module on which it is mounted.

Removable mounting bases 215 are fastened to the pads 205 and support bridge members 220. Members 220 support a transverse translation module 225, parallel to the y axis and driven by a servo motor 230, which combined structure forms a bridge 231 over the work envelope with modules 201 on either side of the bridge. The motor 230 may be connected to the module 225 either by a belt reduction drive 232, gear drive, or a direct drive. The sliding pads 205 support and translate a z axis structure 240 along the y axis and the sensor 212 is mounted along the length of the module 225.

The z axis structure 240 includes two vertical translation modules 245 and sliding pads 205 driven by a single servo motor 250. Two vertical translation modules 245 provide additional strength to support the weight of the structure 240 and prevent the back pressure from a machining operation from displacing the structure, which could cause machining errors. The modules 245 also include sensors 212 along their length. Again, the motor 250 may be connected to modules 245 either by a belt reduction drive 280, gear drive, or a direct drive. The belt reduction drives 232, 280 or gear drives provide increased accuracy in translational movement of the sliding pads 205.

The modules 245 translate a carriage 255 along the z axis, on which a rotation motor 260 is mounted in order to rotate a machine tool 265 about the z axis. In accordance with one preferred embodiment of the invention, the machine tool 265 will be an electric drill for forming apertures in the workpiece. A pivot motor 270 is also mounted on the carriage 255 and the pivot motor rotates the machine tool 265 about all axes perpendicular to the z axis, depending on the position of the rotation motor 260. Rotational sensors 272 are mounted on each of the rotational motor 260 and pivot motor 270 to measure the angular rotation of the motors.

Figure 3:
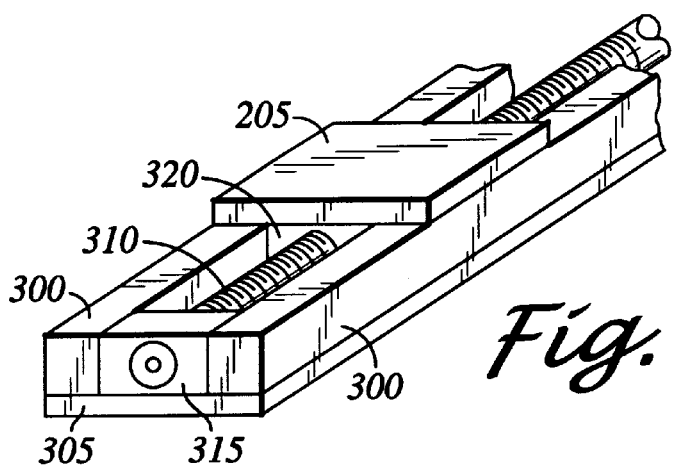
FIG. 3 is a perspective view of a portion of the system of FIG. 2 showing a translation module.
Figure 5:
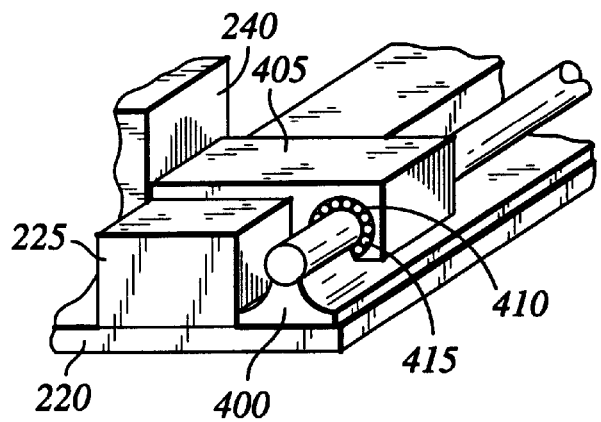
FIG. 5 is a perspective view of a portion of a second embodiment of the system of FIG. 2 showing a ballrail and pad assembly.

The translation modules 201, 225 and 245 use conventional ballscrew drive construction, which provides accurate control at a minimum cost. As shown in FIG. 3, each module 201, 225 and 245 consists of guide rails 300 and a ball lead screw 310 mounted in a parallel position between the rails. The ball lead screw 310 is supported at both ends of the module by bearings 315, which are mounted on a support plate 305 that also supports the rails 300. The pad 205 includes a threaded guide 320 which is positioned adjacent between the rails 300 and engages the screw 310. As the screw 310 turns, the sliding pad 205 translates along the direction of the rails 300. The screw 310 can be coupled directly to a servo motor, such as the motor 210 in FIG. 2, or by means of the belt reduction drives 232, 280 or gear drives, to servo motors 230 and 250, respectively (also in FIG. 2).

Figure 1A:
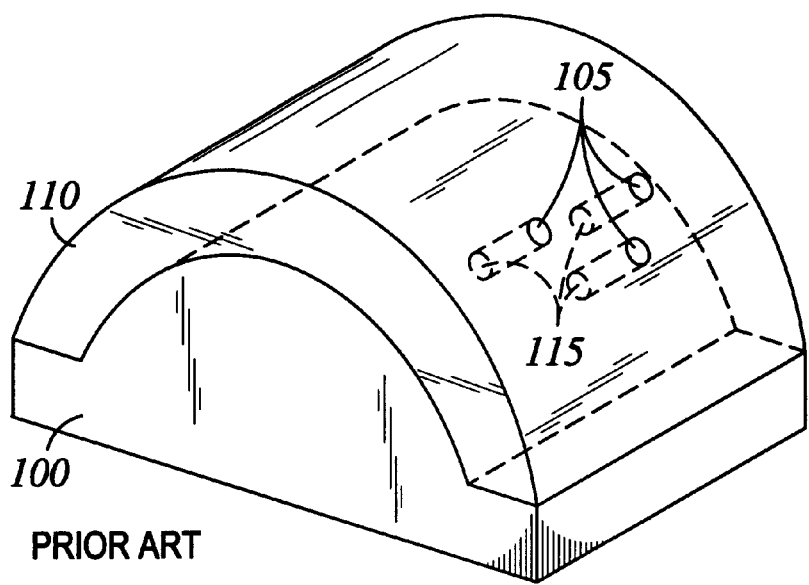
FIGS. 1A and 1B are perspective views prior art molds used to fabricate a drill positioning bonnet.
Figure 1B:
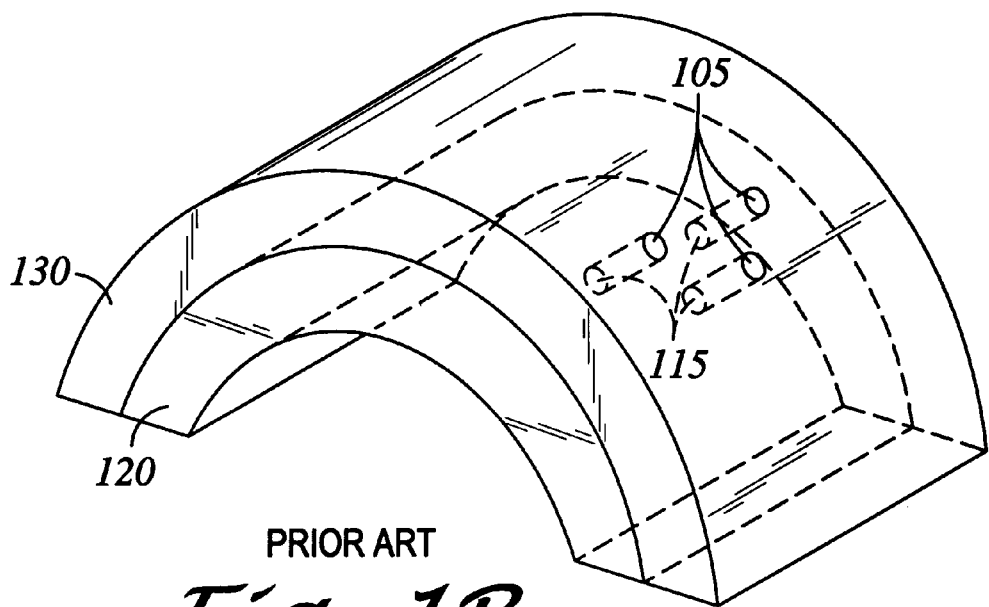
Figure 4:
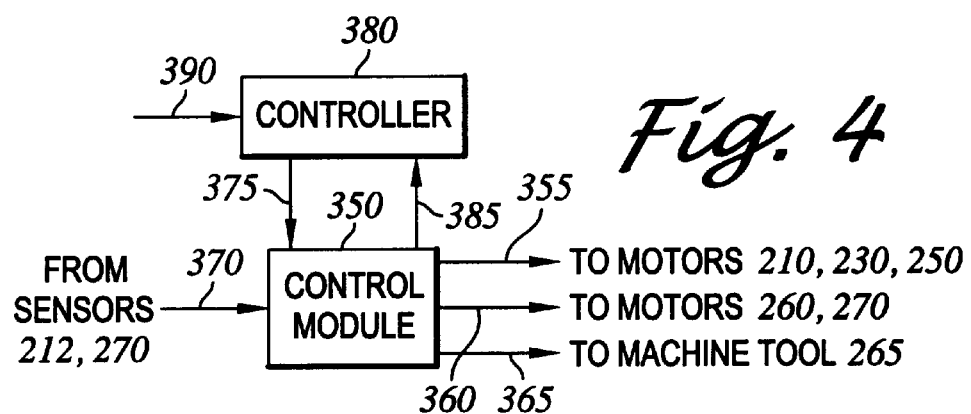
FIG. 4 is a block diagram of a control means for the system of FIG. 2.

The positioning system 200 of FIG. 1 is controlled by the NC devices illustrated in FIG. 4. A conventional servo control module 350, such as a UMH Series, High-Frequency Type, DC Servo Control, made by Baldor of Berne, Switzerland, sends translation signals 355 to the motors 210, 230 and 250 (shown in FIG. 2), rotation signals 360 to the motors 260 and 270 (shown in FIG. 2) and operation signals 365 to the machine tool 265 (shown in FIG. 1). The module 350 receives sensor signals 370 from the linear sensors 212 mounted on each of the modules 201, 225, and 245 and rotational sensors 272 (shown in FIG. 2). The sensor signals 370 measure the proximity of (a) the initial machining part of the machine tool 265 (e.g. the tip of a drill) to a desired set of x, y and z coordinates (referred to as the "vector"), and (b) the orientation of the tool path (e.g. the drill centerline) to the contour of the workpiece surface (referred to as the "normal") as defined by rotation and pivot angles. The module also receives task signals 375 from a conventional industrial controller 380, such as a Delta Tau Controller (made by Data Systems Inc., of Northridge, Calif.) and sends task completion signals 385 to the controller 380. The controller 380 generates the task signals 375 from a workpiece database 390 that is sent to the controller 380. The workpiece database 390 comprises a set of task signals 375 and defines the work to be performed on workpiece, such as the location, orientation and depth of holes.

The operation of the system 200 begins by the mounting of the translation modules 201, as shown in FIG. 2, in a parallel relation on a jig frame 202, as shown in FIG. 6. A bridge 231 of a suitable height and length to access those portions of the workpiece on which the work is to be performed is attached by the bases 215 to the pads 205. A conventional laser alignment tool is used to locate the machine tool 165 with respect to a reference datum of the workpiece.

As shown in FIG. 4., each task signal 375 defines a task to be performed on the workpiece and is generated by the controller 380. For example if the task is to drill a hole in the workpiece, a basic data item in the task signal 375 would be the location of the drill tip, i.e. the vector, and is defined by x, y and z coordinates in relation to the workpiece reference datum used to locate the modules 201 (as shown in FIG. 2). Another data item is the normal, which is defined by angles about the rotation and pivot axes at a selected vector. Other data to be defined could include the speed of the drill, the feed rate at which the drill moves with respect to the workpiece, and the distance that the drill is to travel (which determines the depth of the hole).

The controller 380 holds in memory each task signal 375 in the workpiece database 390. This workpiece database 390 could be provided by a computer aided design ("CAD") program defining a finished workpiece and could be entered in the controller 380 by manual or magnetic means.

In addition, the controller 380 determines when a task signal 375 (e.g. comprising the vector, normal, drill rates and distance) is sent to the control module 350. For example, the controller 380 could be programmed to send the task signal 375 to the module 350 only after a hole drilled pursuant to a previous task signal has been finished, i.e., a "when done" command.

When a task signal 375 is sent to the control module 350, it sends translation signals 355 and rotation signals 360 to move the machine tool 265 (shown in FIG. 2) to the desired vector and normal. If the desired vector or normal of the task signal 375 is not reached by means of the translation signals 355 or rotation signals 360, one or more sensor signals 370 proportional to the error in coordinates or angles will be sent to the module 350. The module 350 then generates appropriate revised translation signals 355 or rotation signals 360 in order to make the correction in vector or normal. The translation signals 355 and rotation signals 360 also include a velocity command that directs the speed of the motors 210, 230 and 250 (shown in FIG. 2) in order to control the time at which the desired vector will be reached.

After the desired position is reached, the module 350 sends the operation signal 365 (i.e. the remaining information from the task signal 375) to accomplish the desired work. For example when a drill reaches a desired vector and normal, the module 350 sends to a drill the operation signal 365, comprising a drill speed, drill feed rate, and a drill distance. After this operation signal 365 has been sent, module 350 sends the completion signal 285 to the controller 355, which then sends a subsequent task signal 375 to the module 350 and the operation is repeated until all the tasks in the workpiece database 390 have been completed.

In a second preferred embodiment, the cost and expense of the linear sensors 212 and rotational sensors 272 (shown in FIG. 2) may be eliminated without adversely affecting the performance of the system 200. This result can be a significant savings because sensors such as digital strips can cost as much as 20 percent of the cost of the system 200.

This embodiment is achieved by using conventional laser measuring means to measure the vector of the machine tool 265 at maximum travel positions of each translation module 201, 225 and 245 (shown in FIG. 2), and at several commanded intermediate positions. These vectors are compared with the location signals 355 (shown in FIG. 4) sent to reach each of the measured positions, and vector errors are determined for each module. This set of vector errors is programmed into the memory of the controller 380. After this calibration procedure, when the workpiece database 390 requires movement to a set of coordinates, the controller 380 corrects the task signal 375 by the amount of the vector errors. A similar calibration procedure is used to measure normal errors and to eliminate the need for rotational sensors 272.

In another preferred embodiment of the invention, a ballrail 400 is mounted on the bridge member 220 and parallel to the transverse module 225. Further, the ballrail 400 is positioned on the opposite side of the module 225 from the z axis structure 240 and is connected to the z axis structure by a modified sliding pad 405, which translates along the module 225 (i.e. y axis) in a manner identical to sliding pad 205 (shown in FIG. 2). The pad 405 is operatively connected to the ballrail 400 at a semicircle 410 whose ballrail facing surface is covered with ball bearings 415. The ballrail 400 and pad 405 assembly (a "ballrail and pad assembly") allows translation along the y axis, but prevents motion of the pad 405 is the z direction. The advantage of the ballrail and pad assembly is to offset the lever arm produced by the z axis structure about the module 225, thus improving stability of the machine tool 265 (shown in FIG. 2) during machine operations. For example during a drilling operation, a resistance force ("drill-back") may develop that can displace the drill and reduce the hole accuracy. The effect of drill-back is substantially reduced by the ballrail and pad assembly.

Although the present invention has been described with reference to preferred embodiments, workers skilled in the art will recognize that changes may be made in form and detail without departing from the spirit and scope of the invention.

What is claimed is:

1. An automated system for the portable positioning and support of a machine tool within a workpiece supporting assembly, comprising:
   a pair of generally parallel, planar longitudinal translation modules removably attached to said assembly and having longitudinal sliding pads and a longitudinal movement device;
   a transverse translation module removably mounted to said longitudinal sliding pads in a generally perpendicular orientation to said longitudinal modules and having transverse sliding pads and a transverse movement device;
   a vertical translation module affixed to said transverse sliding pads in a generally perpendicular orientation to said longitudinal and transverse translation modules and having vertical sliding pads and a vertical movement device, said vertical translation module comprising a mounting device for said machine tool and a rotator to rotate said machine tool about a rotational axis and a pivotor to pivot said machine tool about any pivot axis orthogonal to said rotational axis; and
   a control device coupled to said transverse translation module and said vertical translation module.

2. The system of claim 1 further comprising:
   removable bridge members medial each said longitudinal sliding pad and each end of said transverse translation module so as to elevate said transverse translation module a selected distance from said longitudinal translation module.

3. The system of claim 1 wherein each of said translation modules further comprises:
   a rail supporting each of said respective sliding pads; and
   a linear ballscrew threadedly engaged with each of said respective sliding pads.

4. The system of claim 1 wherein each of said movement device of each of said translation modules further comprises:
   a motor connected to each of said respective translation module for moving each of said respective sliding pads along each of said respective module.

5. The system of claim 4 further comprising:
   a belt reduction drive connecting said motor to each of said respective translation module.

6. The system of claim 1 wherein said vertical translation module further comprises:
   a secondary vertical translation module aligned parallel to said vertical translation module and having secondary vertical sliding pads and connected to said vertical movement device.

7. The system of claim 1 wherein said control device comprises:
   a controller for storing control signals for each of said respective movement device and for said machine tool, and sending said control signals to each of said respective movement device and said machine tool at predetermined intervals.

8. The system of claim 7 wherein said control signals for each of said respective movement device further comprise:
   a set of cartesian coordinates for each of said respective movement devices; and
   a set of angles for each of said rotator and pivotor.

9. The system of claim 7 wherein said control signals for said machine tool further comprise:
   a set of machine tool operation instructions.

10. The system of claim 1 wherein:
   each of said translation modules, rotator, and pivotor further comprises a sensor for measuring a position of each of said respective sliding pads on each of said respective translation modules and a position of said machine tool about said rotational axis and said pivot axis, and sending a position signal;
   a controller for storing control signals for each of said respective movement device and for said machine tool, and sending said control signals; and a control module for receiving each of said respective control signals, sending each of said respective control signals to each of said respective movement devices and to said machine tool, receiving each of said respective sensor position signals, and sending position correction signals to each of said respective movement devices.

11. The system of claim 1 further comprising:

a ballrail mounted parallel to said transverse translation module on a side opposite to said vertical translation module;

a sliding device connected to said transverse sliding pads and engaging said ballrail so as to constrain transverse movement of said transverse sliding pads and to prevent vertical movement of said transverse sliding pads.

12. The system of claim 11 wherein said sliding device comprises:

a support plate connected to one of said transverse sliding pads;

a semicircular aperture in said support plate having a cross section conforming to a cross section of said ballrail; and a plurality of ball bearings rotably engaged in said support plate and medial said support plate and said ballrail.

13. An automated system for the portable positioning and support of a machine tool within a workpiece supporting assembly, comprising:

a first linear translation module removably attached to said assembly and having a first sliding pad and first means to move said first pad along an axis of said module;

a second linear translation module removably mounted on said first sliding pad in a generally perpendicular orientation to said first translation module and having a second sliding pad and second means to move said second pad along an axis of said module;

a third linear translation module affixed to said second sliding pad in a generally perpendicular orientation to said first and second translation modules and having a sliding mounting means and third means to move said mounting means, said mounting means further comprising a rotator means to rotate said machine tool about a rotation axis of said third module and a pivotor means to pivot said machine tool about a pivot axis orthogonal to said third module axis; and a control device coupled to said transverse translation module and said vertical translation module.

14. The system of claim 13 further comprising:

a bridge member medial each said first sliding pad and an end of said second linear translation module so as to elevate said second linear translation module a selected distance from said first linear translation module.

15. The system of claim 13 wherein each of said translation modules further comprises:

a rail supporting each of said respective sliding pads; and a linear ballscrew threadedly engaged with each of said respective sliding pads.

16. The system of claim 13 wherein each of said first, second, and third means to move comprises:

a motor connected to each of said respective translation module for moving each of said respective sliding pads along each of said respective module.

17. The system of claim 16 wherein each of said first, second, and third means to move further comprises:

a belt reduction drive connecting each of said respective motor to each of said respective translation module.

18. The system of claim 13 wherein said third translation module further comprises:

a duplicate vertical translation module aligned parallel to said third translation module and connected to said mounting means and to said third means to move.

19. The system of claim 13 wherein said control device comprises:

a controller for storing control signals for each of said first, second, and third means to move and for said machine tool, and sending said control signals to each of said first, second, and third means to move and said machine tool at predetermined intervals.

20. The system of claim 19 wherein said control signals for each of said first, second, and third means to move further comprise:

a set of cartesian coordinates for each of said first, second, and third means to move; and a set of angles for each of said rotator means to move and said pivotor means to move.

21. The system of claim 19 wherein said control signals for said machine tool further comprise:

a set of machine tool operation instructions.

22. The system of claim 13 wherein:

each of said translation modules, rotator and pivotor means further comprises a sensor for measuring a position of each of said respective sliding pads on each of said first and second modules, and of said mounting means of said third module, and a position of said machine tool about said rotation axis and said pivot axis, and sending a position signal;

a controller for storing control signals for each of said first, second, and third means to move and for said machine tool, and sending said control signals; and a control module for receiving each of said respective control signals, sending each of said respective control signals to each of said first, second, and third means to move and to said machine tool, receiving each of said respective sensor position signals, and sending position correction signals to each of said first, second, and third means to move.

23. The system of claim 13 further comprising:

a ballrail mounted parallel to said second translation module on a side opposite to said third translation module;

sliding means connected to said second sliding pads and engaging said ballrail so as to constrain transverse and vertical movement of said second sliding pads.

24. The system of claim 23 wherein said sliding means comprises:

a support plate connected to one of said second sliding pads;

a semicircular aperture in said support plate having a cross section conforming to a cross section of said ballrail; and a plurality of ball bearings rotably engaged in said support plate and medial said support plate and said ballrail.

25. A transportable tool positioning system, comprising:

a support assembly located adjacent a workpiece, said support assembly including a plurality of reference positions;

a portable multi-axis numerically controlled tool detachably mounted to any one of said reference positions for performing tooling operations on said workpiece, wherein said portable multi-axis tool comprises:

a plurality of translation modules detachably mounted to any one of said reference positions of said assembly and having longitudinal sliding pads and a longitudinal movement device;

a transverse translation module removably mounted to said longitudinal sliding pads in a generally perpendicular orientation to said longitudinal modules and having transverse sliding pads and a transverse movement device; and a vertical translation module affixed to said transverse sliding pads in a generally perpendicular orientation to said longitudinal and transverse translation modules and having vertical sliding pads and a vertical movement device, said vertical translation module comprising a mounting device for said machine tool and a rotator to rotate said machine tool about a rotational axis and a pivotor to pivot said machine tool about any pivot axis orthogonal to said rotational axis; and a multi-movement control device coupled to said portable multi-axis tool.

26. The system of claim 25 further comprising:

removable bridge members medial each said longitudinal sliding pad and each end of said transverse translation module so as to elevate said transverse translation module a selected distance from said longitudinal translation module.

27. The system of claim 25 wherein each of said translation modules further comprises:

a rail supporting each of said respective sliding pads; and a linear ballscrew threadedly engaged with each of said respective sliding pads.

28. The system of claim 25 wherein each of said movement device of each of said translation modules further comprises:

a motor connected to each of said respective translation module for moving each of said respective sliding pads along each of said respective module.

29. The system of claim 28 further comprising:

a belt reduction drive connecting said motor to each of said respective translation module.

30. The system of claim 25 wherein said vertical translation module further comprises:

a secondary vertical translation module aligned parallel to said vertical translation module and having secondary vertical sliding pads and connected to said vertical movement device.

31. The system of claim 25 wherein said control device comprises:

a controller for storing control signals for each of said respective movement device and for said machine tool, and sending said control signals to each of said respective movement device and said machine tool at predetermined intervals.

32. The system of claim 31 wherein said control signals for each of said respective movement device further comprise:

a set of cartesian coordinates for each of said respective movement devices; and a set of angles for each of said rotator and pivotor.

33. The system of claim 32 wherein said control signals for said machine tool further comprise:

a set of machine tool operation instructions.

34. The system of claim 25 wherein:

each of said translation modules, rotator, and pivotor further comprises a sensor for measuring a position of each of said respective sliding pads on each of said respective translation modules and a position of said machine tool about said rotational axis and said pivot axis, and sending a position signal;

a controller for storing control signals for each of said respective movement device and for said machine tool, and sending said control signals; and a control module for receiving each of said respective control signals, sending each of said respective control signals to each of said respective movement devices and to said machine tool, receiving each of said respective sensor position signals, and sending position correction signals to each of said respective movement devices.

35. The system of claim 25 further comprising:

a ballrail mounted parallel to said transverse translation module on a side opposite to said vertical translation module;

a sliding device connected to said transverse sliding pads and engaging said ballrail so as to constrain transverse movement of said transverse sliding pads and to prevent vertical movement of said transverse sliding pads.

36. The system of claim 35 wherein said sliding device comprises:

a support plate connected to one of said transverse sliding pads;

a semicircular aperture in said support plate having a cross section conforming to a cross section of said ballrail; and a plurality of ball bearings rotably engaged in said support plate and medial said support plate and said ballrail.

37. The system of claim 25 wherein said third translation module further comprises:

a duplicate vertical translation module aligned parallel to said third translation module and connected to said mounting device and to said vertical movement device.

* * * * *